United States Patent [19]
Coile et al.

[11] Patent Number: 6,061,349
[45] Date of Patent: May 9, 2000

[54] SYSTEM AND METHOD FOR IMPLEMENTING MULTIPLE IP ADDRESSES ON MULTIPLE PORTS

[75] Inventors: Brantley W. Coile, Athens; Richard A. Howes, Roswell; Edward C. Kersey, Athens, all of Ga.

[73] Assignee: Cisco Technology, Inc., San Jose, Calif.

[21] Appl. No.: 08/850,730

[22] Filed: May 2, 1997

Related U.S. Application Data

[63] Continuation of application No. 08/552,807, Nov. 3, 1995, Pat. No. 5,793,763.

[51] Int. Cl.$^7$ ....................................................... H04J 3/24
[52] U.S. Cl. .......................... 370/389; 370/392; 370/401
[58] Field of Search ................................. 370/389, 392, 370/400, 401, 402, 475; 709/219, 226, 228, 229, 227, 238

[56] References Cited

U.S. PATENT DOCUMENTS

| | | | |
|---|---|---|---|
| 5,371,852 | 12/1994 | Attanasio et al. | 395/200 |
| 5,530,905 | 6/1996 | Nichols et al. | 709/227 |
| 5,617,417 | 4/1997 | Sathe et al. | 370/394 |
| 5,740,172 | 4/1998 | Kang | 370/392 |
| 5,790,800 | 8/1998 | Gauvin et al. | 709/227 |
| 5,793,763 | 8/1998 | Mayes et al. | 370/389 |
| 5,815,664 | 9/1998 | Asano | 709/227 |
| 5,845,068 | 12/1998 | Winiger | 713/200 |
| 5,894,554 | 4/1999 | Lowery et al. | 395/200.33 |

FOREIGN PATENT DOCUMENTS

| | | |
|---|---|---|
| PCT/FR96/01179 | 2/1997 | WIPO . |

*Primary Examiner*—Salvatore Cangialosi
*Attorney, Agent, or Firm*—Ritter, Van Pelt & Yi, LLP

[57] ABSTRACT

Disclosed is a system and method for handling a plurality of connection requests made for a plurality of virtual machines with a single physical machine. A system and method are disclosed for distributing virtual connections among a plurality of physical machines some or all of which are configured to handle connections for more than one virtual machine. In one embodiment, a packet translation system for handling connections from clients on an external network to a plurality of IP addresses with a server having a server IP address and a server port number includes a client interface to the external network. The client interface is operative to receive and send packets to and from a remote client. A server interface is operative to receive and send packets to and from the server and the server is operative to establish a connection with the remote client. A packet interceptor is operative to intercept incoming packets received at the client interface which have a packet destination IP address and a packet destination port number corresponding to a virtual machine IP address and a virtual machine port number which is supported by the packet translation system. A packet header translator is operative to translate the packet destination IP address and the packet destination port number of packets forwarded by the packet interceptor to a physical machine IP address and a physical machine port number that corresponds to the server IP address and the server port number of the server. The server port runs a real process corresponding to a virtual process simulated on the virtual port number. As a result, the packet translation system receives packets at the client interface and the packet destination IP address and the packet destination port number corresponding to the virtual machine IP address and the virtual machine port number are translated to the server IP address and the server port number and the packets are forwarded to the server via the server interface.

23 Claims, 10 Drawing Sheets

FIG. 6A

VIRTUAL MACHINE OBJECT 600

| | |
|---|---|
| 602 | POINTER TO NEXT VIRTUAL MACHINE OBJECT |
| 604 | VIRTUAL IP ADDRESS |
| 606 | POINTER TO A PORT OBJECT |
| 608 | POINTER TO LINK OBJECT |
| 610 | STATE |
| 612 | BACKUP |

FIG. 6B

PHYSICAL MACHINE OBJECT 620

| | |
|---|---|
| 618 | POINTER TO NEXT PHYSICAL MACHINE OBJECT |
| 621 | PHYSICAL IP ADDRESS |
| 622 | STATE |
| 624 | NUMBER OF DITCHED CONNECTIONS |
| 626 | CONNECTION FAILURE THRESHOLD |
| 628 | POINTER TO BACKUP |
| 630 | PORT VARIABLE |

FIG. 6C

CONNECTION OBJECT 640

| | |
|---|---|
| 641 | POINTER TO NEXT CONNECTION OBJECT |
| 642 | FOREIGN IP ADDRESS |
| 644 | FOREIGN PORT NUMBER |
| 646 | VIRTUAL IP ADDRESS |
| 648 | VIRTUAL PORT NUMBER |
| 650 | PHYSICAL IP ADDRESS |
| 652 | PHYSICAL PORT NUMBER |
| 653 | NUMBER OF RESENDS |

FIG. 6D

PORT OBJECT 680

| | |
|---|---|
| 662 | POINTER TO NEXT PORT OBJECT |
| 664 | VIRTUAL PORT NUMBER |
| 666 | PHYSICAL PORT NUMBER |

SYSTEM AND METHOD FOR IMPLEMENTING MULTIPLE IP ADDRESSES ON MULTIPLE PORTS

CROSS REFERENCE TO RELATED APPLICATIONS

This application is a continuation in part of application Ser. No. 08/552,807 filed Nov. 3, 1995, now U.S. Pat. No. 5,793,763, which is incorporated herein by reference for all purposes.

This application is related to application Ser. Nos. 08/850, 248 now abandoned and 08/850,836 now pending, filed concurrently herewith, which are incorporated herein by reference for all purposes.

BACKGROUND OF THE INVENTION

The present invention relates to methods and apparatus for implementing multiple IP addresses on multiple ports of a physical machine. More specifically, the invention relates to methods and apparatus for intercepting packets which are addressed to a virtual port on a virtual machine and translating the destination IP address and the destination port number to a destination IP address and destination port number of a physical machine which acts as a host or server and is selected to handle connections.

With the recent explosive growth of the Internet, a very large percentage of businesses, including many small businesses, desire to have an internet site which is dedicated to them. An internet site is generally implemented on an internet server which is connected to the internet via an internet service provider (ISP). As described in to co-pending application Ser. No. 08/850,248 now abandoned, (Attorney Docket No. CISCP005 previously incorporated by reference, some internet sites are busy enough to require a plurality of servers in order to handle all of the connections which are made to those sites. Accordingly, co-pending application Ser. No. 08/850,248 now abandoned, (Attorney Docket No. CISCP005 describes a system and method for monitoring the availability of servers at an Internet site which simulate a virtual server and preferentially sending new connection requests to servers which are available for connections and which are likely to have faster response times. For less visited sites, the opposite situation is presented. Instead of one site requiring a plurality of servers, it would be desirable to combine a plurality of sites on a single server, since each one of the individual sites would not require all of the capacity of the server in order to service its connection traffic.

One way of handling this would be to provide a plurality of small sites on a single server which can support a plurality of connections to a plurality of IP addresses. Currently, servers which are capable of having two or more physical connections to other networks are referred to as multihomed hosts. Multihomed hosts must have a unique IP address for each of their physical connections.

FIG. 1 is an illustration of a multi-homed server 102 which serves three different IP addresses. Messages sent to a first IP address x.x.x.1 are routed to a first set of ports 104, which includes a port 80 which services WorldWide Web traffic, a port 20 which is the FTP data port, and a port 23 which is the Telnet port. Other ports may also be included within set of ports 104. The WorldWide Web, the FTP data, and the TelNet ports are mentioned because they are well known port numbers which by convention, always support those respective functions. A second set of ports 106 also includes a port 80, a port 20, and a port 23 which receive connections for IP address x.x.x.2, and a third set of ports 108 receive connections which are made to IP address x.x.x.3.

Each set of ports which responds to an IP address is an Internet site. A first set of ports 104 corresponds to the site whose domain name is site1.com. A second set of ports 106 corresponds to a site whose domain name is site2.com, and a third set of ports 108 corresponds to an Internet site whose domain name is site3.com. Multi-homed server 102 thus supports connections for each of the Internet sites and accepts connections to the IP address which represents each respective site. For each site, a set of daemons are run at each of the ports, including the well-known ports for that site.

While multihomed hosts make it possible to handle multiple connections to a different IP addresses on a single server, multihomed hosts can create problems in managing traffic. Furthermore, not all commercially available servers or operating systems are configured to be capable of functioning as a multihomed host. It would therefore be desirable if a system and method for servicing a plurality of IP addresses could be developed for servers which do not act as multihomed hosts.

It is also true that Internet traffic tends to be distributed among sites in a manner which is nonhomogenous. That is, certain sites receive a very large quantity of traffic while others receive little or no traffic. Furthermore, traffic on certain cites may increase or decrease unpredictably. It would be desirable if a flexible system and method could be developed for sharing connection load among a group of servers in a manner that would not require any of the servers to be multihomed servers, but that would allow each server to service more than one site and multiple servers to share the load for individual sites.

SUMMARY OF THE INVENTION

The present invention provides a system and method for handling a plurality of connection requests made for a plurality of virtual machines with a single physical machine. The present invention further provides a system and method for distributing virtual connections among a plurality of physical machines some or all of which are configured to handle connections for more than one virtual machine.

In one embodiment, a packet translation system for handling connections from clients on an external network to a plurality of IP addresses with a server having a server IP address and a server port number includes a client interface to the external network. The client interface is operative to receive and send packets to and from a remote client. A server interface is operative to receive and send packets to and from the server and the server is operative to establish a connection with the remote client. A packet interceptor is operative to intercept incoming packets received at the client interface which have a packet destination IP address and a packet destination port number corresponding to a virtual machine IP address and a virtual machine port number which is supported by the packet translation system. A packet header translator is operative to translate the packet destination IP address and the packet destination port number of packets forwarded by the packet interceptor to a physical machine IP address and a physical machine port number that corresponds to the server IP address and the server port number of the server. The server port runs a real process corresponding to a virtual process simulated on the virtual port number. As a result, the packet translation system receives packets at the client interface and the packet destination IP address and the packet destination port number corresponding to the virtual machine IP address and the virtual machine port number are translated to the server IP address and the server port number and the packets are forwarded to the server via the server interface.

BRIEF DESCRIPTION OF THE DRAWINGS

FIG. 6A illustrates the data structure of a virtual machine object.

FIG. 6B illustrates the data structure of a physical machine object.

FIG. 6C illustrates a connection object data structure.

FIG. 6D illustrates a Port object data structure.

DESCRIPTION OF THE PREFERRED EMBODIMENTS

Figure 1:
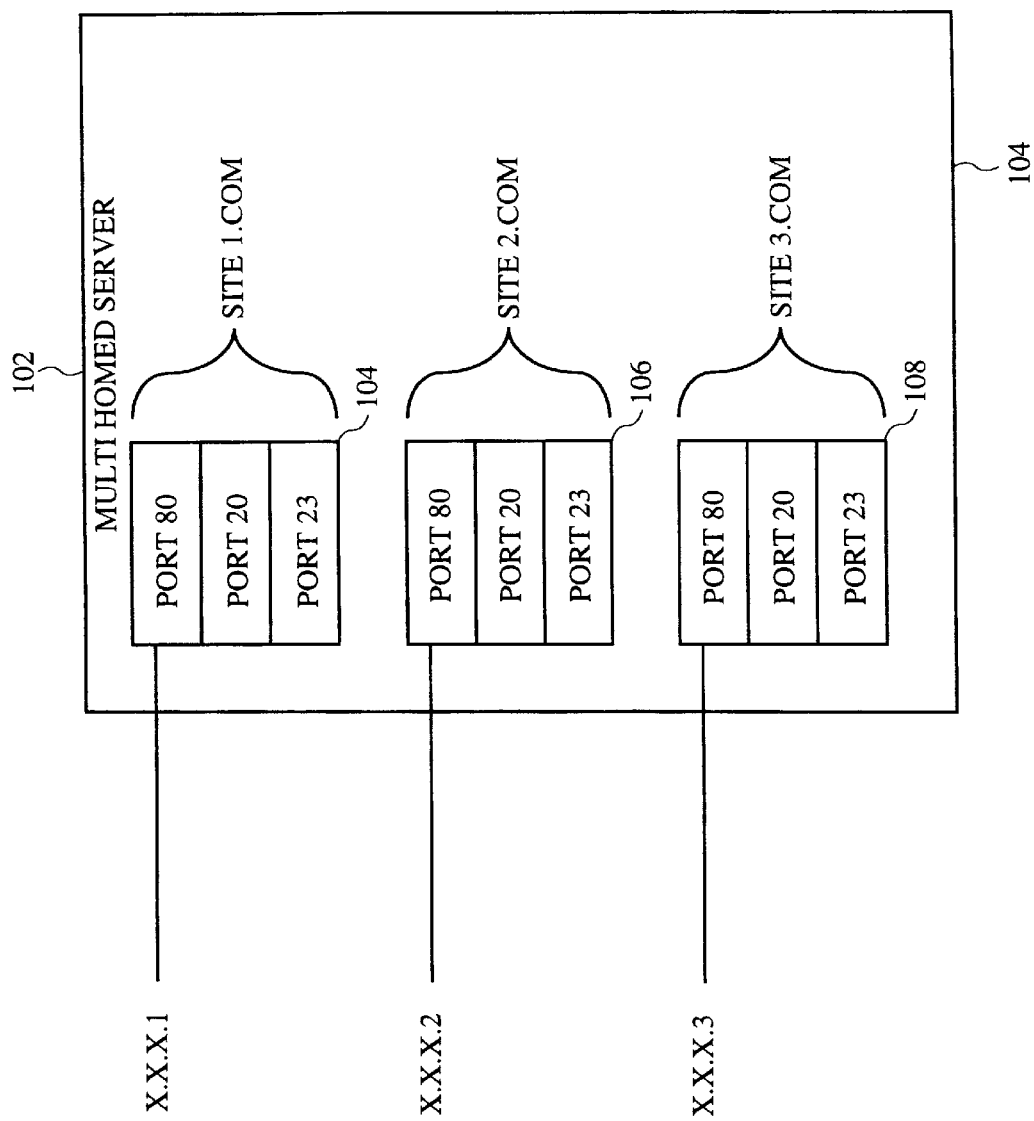
FIG. 1 is an illustration of a multi-homed server 102 which serves three different IP addresses.

The basic problem of networking a set of devices has been divided into layers. The bottom layer is a physical layer. It handles the actual physical connections between devices. The second layer is the data link layer. It describes how the data is formatted which is on the physical medium which connects the devices. The third layer is the network layer. It handles cases where there is greater than one connection per machine. The fourth layer is the transport layer. This determines that all of the messages from a source reach the destination reliably and in an unduplicated fashion. The second layer is subdivided into a Logical Link Control ("LLC") layer and a Media Access Control ("MAC") layer. A MAC address is required in this layer. In the TCP/IP suite of protocols employed on the Internet, the third layer or network layer is the IP layer. This layer requires a globally unique IP address in order to route packets to the right physical machine. The IP address is issued by a central authority known as the Internet Assigned Number Authority ("IANA"). Also, in TCP/IP, the fourth layer or transport layer is the TCP layer. The TCP layer additionally requires a machine port number so that the packet is sent to the correct port of a specific machine. The present invention is implemented in one embodiment by redefining virtual destination IP addresses and port numbers in packet headers so that inbound packets are routed by a Local Director to a port number of a specific physical machine that runs an appropriate daemon to service the destination virtual port number on the virtual destination machine.

Normally, a human user of the Internet addresses his or her request to a particular internet site by specifying a particular domain name (for example, www.NameX.com). The user also requests a specific port for the server which is to service the request. The request may be directed to port 80, for example, which is the well known port that services http or WorldWide web traffic. By convention, all servers have a daemon which runs on port 80 that runs a process which services WorldWide web traffic. Similarly, other well known ports have other daemons running on them which also run standard processes. Other ports may also be implemented which are not well known ports and which run any process that is specified by the user.

An IP packet sent by a user for the purpose of sending data to an existing connection or establishing a connection contains an IP address in its header for the destination machine to which the connection is made and also a port number for the destination machine. The IP address is obtained from a Domain Name Service (DNS) server that returns an IP address for the domain name selected by the user. The port number is selected by the user to be either a well known port or else some other port which the user knows has a certain daemon running on it with which the user desires to interact. The present invention implements a plurality of internet sites on a single server by running all of the daemons for each internet site on a different set of ports that are defined for that site. A "Local Director" is provided to intercept packets which are directed to certain ports by a user. Once a packet from a user is intercepted, the Local Director translates the destination port number specified by the user to the destination port number which corresponds to the port on which a server is running the daemon for the user specified port of the user specified destination IP address.

Different IP addresses, for example, have the daemons which are supposed to run on their respective well known ports running on different ports of the machine on which multiple IP addresses are implemented. The user need never learn to what ports the well known ports for each IP address are mapped. The Local Director takes care of changing the well known port number requested by the user to the appropriate mapped port number in each packet sent by the user. Furthermore, the user need never know or discover the IP address of the machine to which the connection is being made since the Local Director also takes care of replacing the IP address and port number requested by the user with the IP address and port number of the machine which implements that IP address in each packet sent by the user. Since the Local Director maps IP addresses and port numbers in packets sent by the user to a new IP addresses and port number, it is possible to implement many IP addresses and port numbers on a single machine which only has a single IP address of its own, as well as many ports which run all of the daemons that the user expects to find on the ports of the machine corresponding to the IP address to which the user is attempting to connect.

Figure 2A:
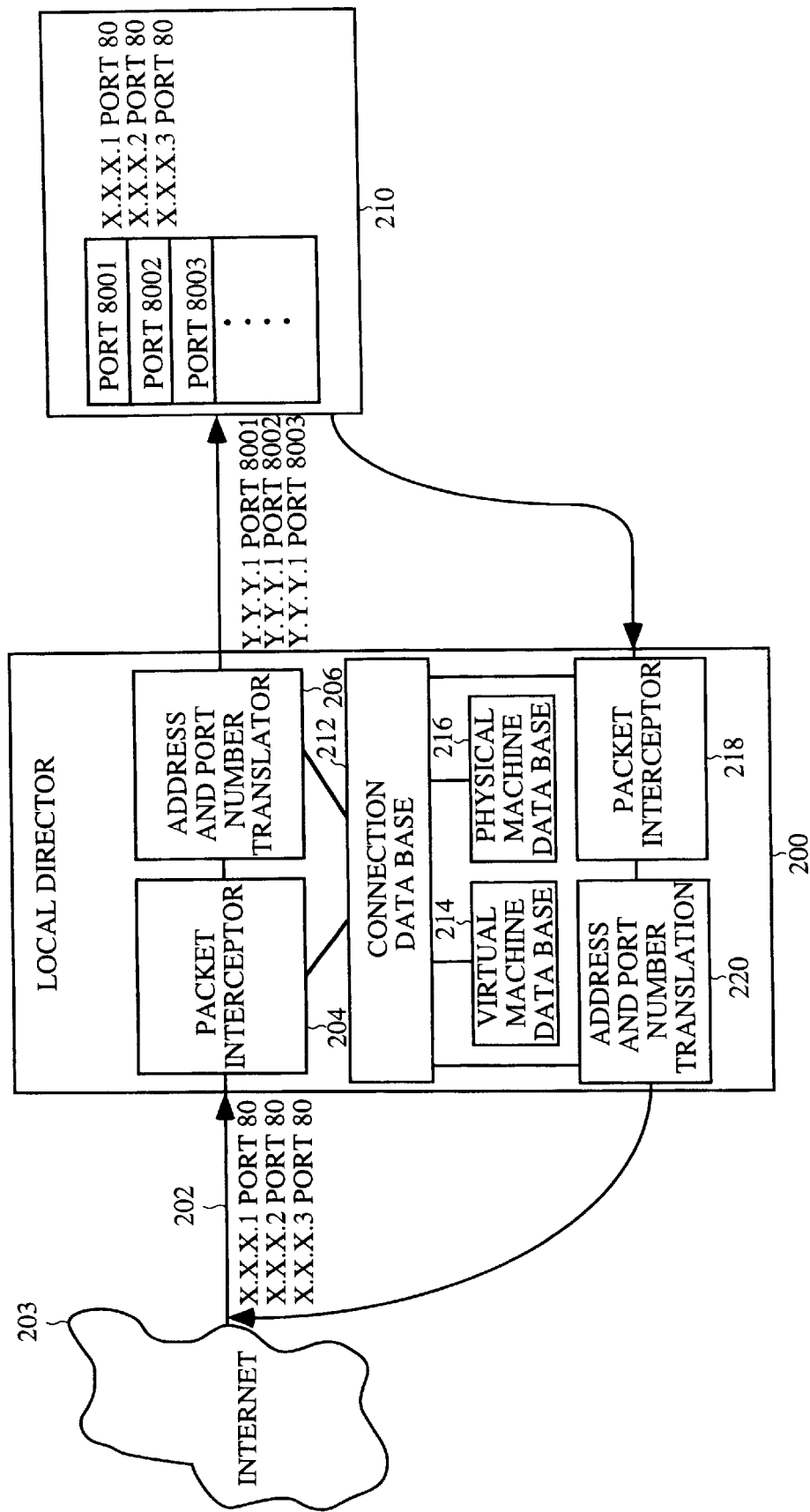
FIG. 2A illustrates a system in which a Local Director intercepts packets for a plurality of IP addresses and sends them to the appropriate port on a machine which has only one IP address but which is implementing processes for a plurality of IP addresses on its various ports.

FIG. 2A illustrates a system in which a Local Director 200 intercepts packets for a plurality of IP addresses and sends them to the appropriate port on a machine which has only one IP address but which is implementing processes for a plurality of IP addresses on its various ports. A network communication line 202 receives requests from a client over the Internet 203. Network communication line 202 carries packets which are addressed to three different Internet sites having the IP addresses x.x.x.1, x.x.x.2, and x.x.x.3. For the purposes of this example, each of the packets illustrated also contain the destination port 80. As mentioned above, port 80 is the well known port which runs a daemon that services http or WorldWide web traffic.

It should be recognized that in the above paragraph and throughout this specification, the user who is accessing internet site via Local Director 200 is referred to as the "client," and the group of machines associated with Local Director 200 are referred to as "servers." It should, however, be recognized that in certain applications, the group of machines associated with Local Director 200 would actually be considered the client and the device on the other side of Local Director 200 would be considered the server. Such applications also fall within the scope of the present invention. It should also be recognized that, although the embodiment described establishes connections to the Internet using TCP/IP, the present invention may also be used in conjunction with other protocols to connect to a LAN or WAN.

Local Director 200 contains a packet interceptor 204 which intercepts packets containing certain destination IP addresses and port numbers. An address and port number translator 206 replaces the destination IP address and destination port number in the packets with the address and port number of a physical machine 210 which implements the virtual machine that corresponds to the destination IP addresses specified by the client on network communication line 202.

The term virtual machine is used to describe a machine which corresponds to the destination IP address specified by the client because no such physical machine actually exists. However, the virtual machine appears to exist to the client because when the client specifies the IP address of the virtual machine in a packet, that packet is handled by physical machine 210 as if the virtual machine actually existed as a physical machine with the virtual machine IP address. By translating the IP addresses and port numbers in packets whose destination IP address and port number corresponds to a virtual machine which Local Director 200 is supporting, Local Director 200 enables physical machine 210 to implement each of the virtual machines.

Address and port number translation is supported on Local Director 200 by a connection database 212. Connection database 212 contains a mapped destination IP address and mapped port number for each connection made to a virtual machine IP address and a virtual port number that is supported by Local Director 200. This information is stored in connection objects contained in connection database 212. Thus, for each connection being currently handled by Local Director 200, a connection object in connection database 212 contains the source IP address and port number, the virtual machine IP address and port number, and a physical machine IP address and port number. Packets corresponding to a connection made from a given source IP address and port number to a given virtual destination IP address and port number are sent to the destination IP address and port number of a physical machine.

In order to support new connections, connection database 212 accesses a virtual machine database 214 and a physical machine database 216. Virtual machine database 214 contains a list of all the virtual machines supported by Local Director 200. They are stored as virtual machine objects. Physical machine database 216 contains a list of all the physical machines available to Local Director 200 to implement the virtual machines in virtual machine database 214. When a SYN request for a new connection is intercepted by Local Director 200, Local Director 200 checks virtual machine database 214 to determine whether the destination IP address and port number corresponds to a virtual machine that is supported by Local Director 200. If a virtual machine match is found, then physical machine database 216 is used to find a physical machine which is linked to the virtual machine for which a connection is being requested. In certain embodiments, a session distribution scheme such as a session distribution scheme as described in U.S. patent application Ser. No. 08/850,248 filed May 2, 1997 (Attorney Docket No. CISCP005) previously incorporated by reference, is used to determine the best physical machine from among all of the physical machines available to handle the requested connection.

To the client who is sending and receiving packets on network communication line 202, it appears that a connection has been made to the virtual machine which corresponds to the virtual destination IP address specified by the client. The client does not know that the address and port number are translated by Local Director 200 and actually handled by physical machine 210. Outbound packets from physical machine 210 are intercepted by a packet interceptor 218 and the source IP address and port number of those packets is translated by an address and port number translator 220. Packet interceptor 218 and port number translator 220 use connection database 212 to find correct virtual IP address and port number to replace the IP address and port number of physical machine 210 as the source IP address and port number of the packet. Thus, not only is the connection requested by a client to a virtual machine redirected without the client's knowledge to physical machine 210, but the returned packets from physical machine 210 are altered so that it also appears to the client that the return packets are sent from the virtual machine which the client attempted to access.

Physical machine 210 is able to handle packets intended for each of the virtual machines implemented on physical machine 210 because those packets all have destination addresses translated by Local Director 200 to be y.y.y.1, the IP address of physical machine 210. Each of the port numbers requested by the client are likewise translated to an individual port on physical machine 210 that implements the appropriate daemon for the client requested port number. In the example shown, port 80 of the first IP address is implemented on port 8001, port 80 of the second IP address is implemented on port 8002, and port 80 of the third IP address is implemented on port 8003. Thus, physical machine 210 need not be a multi-homed server capable of supporting a multiple number of physical connections to different IP addresses. Physical machine 210 need only include a single physical connection for its own IP address, together with the appropriate daemons running on port numbers which are mapped to virtual machine port numbers by Local Director 200.

It should be noted that this example illustrates the mapping of well known port number 80 for three different virtual machines to three different ports on physical machine 210. Likewise, all of the other well known ports (or at least as many as are supported by physical machine 210 in a given situation), are mapped to different ports on physical machine 210. Physical machine 210, therefore, can implement as many virtual ports for a virtual machine as are desired in any given system.

Local Director 200 employs various process steps involving data manipulation. These steps require physical manipulation of physical quantities. Typically, these quantities take the form of electrical or magnetic signals capable of being stored, transferred, combined, compared, and otherwise manipulated. It is sometimes convenient, principally for reasons of common usage, to refer to these signals as bits, values, variables, characters, data packets, or the like. It should be remembered, however, that all of these and similar terms are to be associated with the appropriate physical quantities and are merely convenient labels applied to these quantities.

Further, the manipulations performed are often referred to in terms, such as translating, running, selecting, specifying, determining, or comparing. In any of the operations described herein that form part of the present invention, these operations are machine operations. Useful machines for performing the operations of the present invention include general purpose and specially designed computers or other similar devices. In all cases, there should be borne in mind the distinction between the method of operations in operating a computer or other processing device and the method of computation itself. The present invention relates to method steps for operating a Local Director system in processing electrical or other physical signals to generate other desired physical signals.

The present invention also relates to an apparatus for performing these operations. This apparatus may be specially constructed for the required purposes, or it may be a general purpose programmable machine selectively activated or reconfigured by a computer program stored in memory. The processes presented herein are not inherently related to any particular computer or other apparatus. In particular, various general purpose machines may be used with programs written in accordance with the teachings herein, or it may be more convenient to construct a more specialized apparatus to perform the required method steps. The general structure for a variety of these machines will appear from the description given below.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 2B:
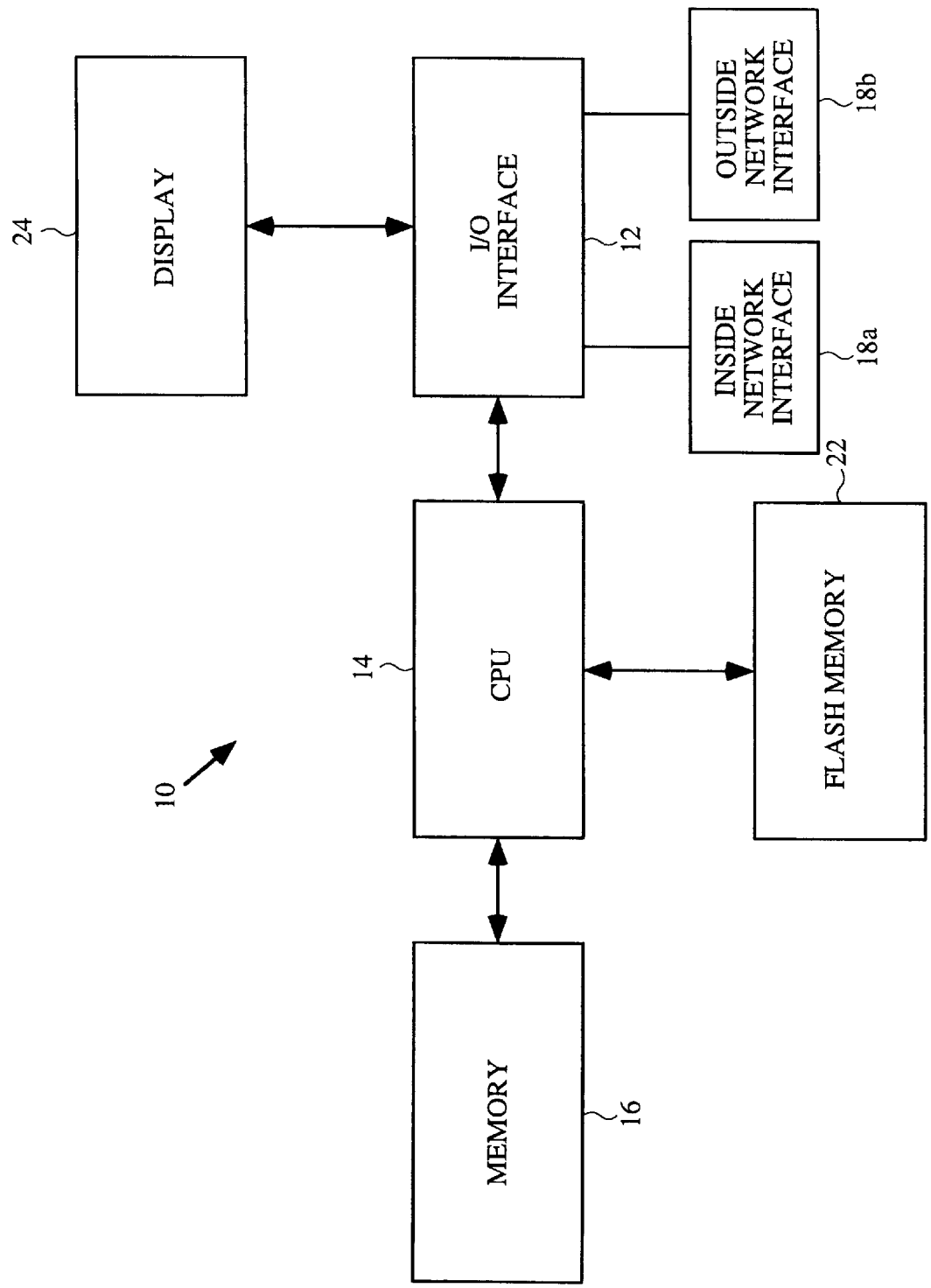
FIG. 2B shows a typical computer-based system which may be used as a Local Director of the present invention.

FIG. 2B shows a typical computer-based system which may be used as a Local Director of the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

Connected to the input/output circuit 12 are inside and outside high speed Local Area Network interfaces 18a and 18b. The inside interface 18a will be connected to a private network, while the outside interface 18b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 18a and 18b are preferably multiport Ethernet interfaces, but may be other appropriate interfaces such as FDDI interfaces, etc.

The computer system may also include an input device (not shown) such as a keyboard. A flash memory device 22 is coupled to the input/output circuit 12 and provides additional storage capability for the computer 10. The flash memory device 22 may be used to store programs, data and the like and may be replaced with a magnetic storage medium or some other well known device. It will be appreciated that the information retained within the flash memory device 22, may, in appropriate cases, be incorporated in standard fashion into computer 10 as part of the memory 16.

In addition, a display monitor 24 is illustrated which is used to display the images being generated by the present invention. Such a display monitor 24 may take the form of any of several well-known varieties of cathode ray tube displays and flat panel displays or some other type of display.

Although the system shown in FIG. 2B is a preferred computer system of the present invention, the displayed computer architecture is by no means the only architecture on which the present invention can be implemented. For example, other types of interfaces and media could also be used with the computer.

As noted above, the present invention allows multiple internet sites to be implemented on a single physical machine. The full potential of the invention is realized in combination with a system that also includes implementing single sites on many machines and distributing the traffic among the machines. In such a system, the capacity of each physical machine is used most efficiently since enough sites can be implemented on each machine to use the capacity of the machine, but overloading of the machine is avoided since connections can alternatively be routed to other physical machines based on demand.

Figure 3:
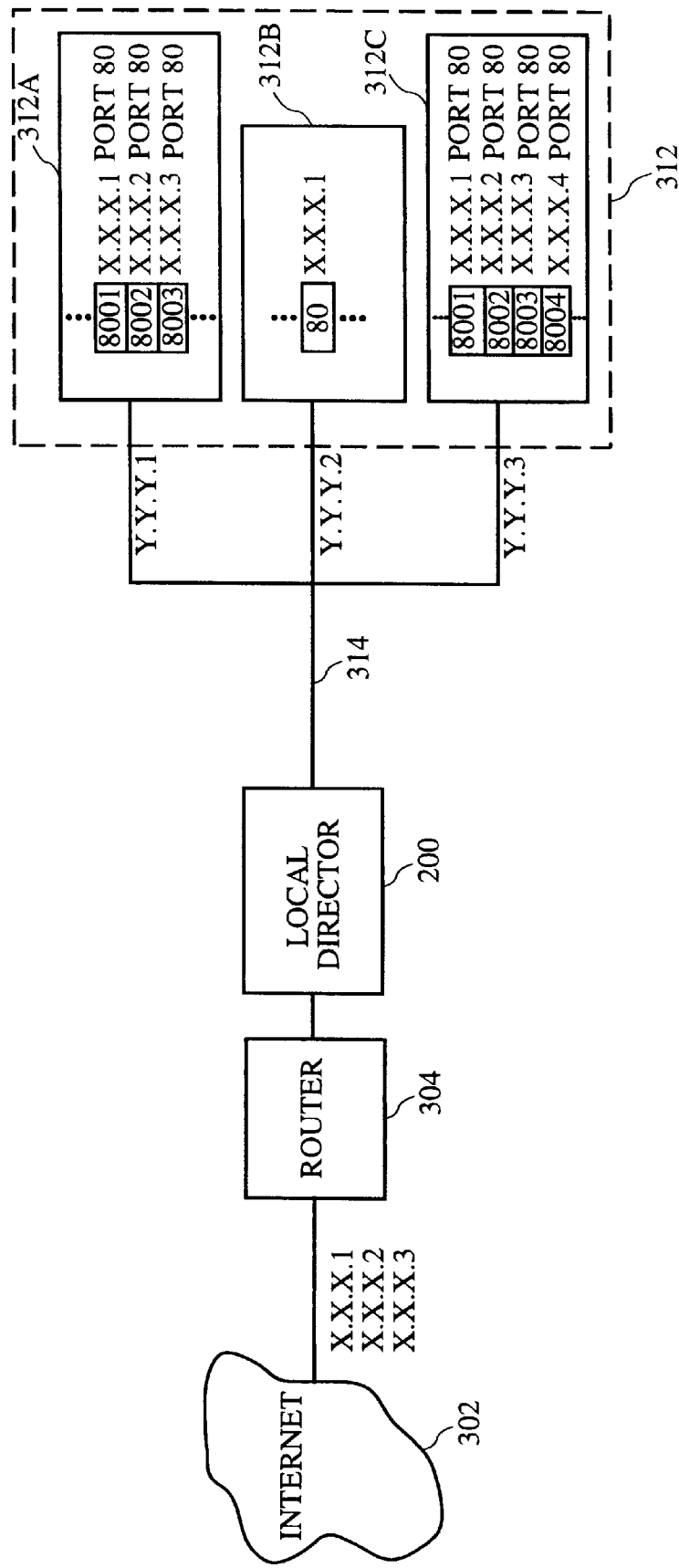
FIG. 3 is a block diagram of a network segment which includes many virtual machines corresponding to many different IP addresses which are implemented on a group of physical machines which can service the IP addresses.

FIG. 3 is a block diagram of a network segment which includes many virtual machines corresponding to many different IP addresses which are implemented on a group of physical machines which can service the IP addresses. A group of TCP based servers 312 is connected to the whole of the Internet 302 through a router 304. Specifically, router 304 typically provides a connection to an Internet service provider. A Local Director 200 is directly connected to router 302 and serves as a front end to group of TCP based servers 312. The group of TCP based servers 312 (including server 312A, server 312B, and server 312C in the example shown in FIG. 3 may include a large number of servers and may generally provide any kind of TCP service.

For example, the group of TCP based servers 312 may be World Wide Web servers, FTP servers, mail servers, news servers, database servers, Telnet servers, etc., or the group of TCP based servers may each perform a combination of those tasks. Servers 312A, 312B, and 312C as well as other servers and devices are connected to one another through a network cable 314.

Requests to a virtual machine from external sites on Internet 302 are routed through Local Director 200. Local Director 200 determines which server of group of TCP based servers 312 should receive the request. A group of virtual IP addresses are defined for the internet sites which are implemented on group of TCP based servers 312. Each virtual IP address is an IP address which the outside world, including the rest of the Internet 302, uses to access an internet site implemented on either one or some combination of the physical machines which make up group of TCP based servers 312. The individual identities and IP addresses of the individual servers within the group of TCP based servers 312 are not evident to the user. A plurality of virtual machines are implemented on different port numbers on certain of the real or physical machines. Other physical machines may be configured to service only one specific site. Each virtual machine may allocate connections to a plurality of physical machines, or on a single physical machine if desired.

The Local Director 200 effectively simulates communication inbound to virtual machines having virtual IP addresses using the set of physical machines provided in the group of TCP based servers 312 by intercepting inbound packets sent to a virtual machine and replacing the virtual IP address and port number with a physical machine IP address and port number. Similarly, the Local Director 200 effectively simulates communication outbound from one or more virtual machines by intercepting outbound packets from the physical machines and replacing the physical machine IP addresses with virtual machine IP addresses.

When router 304 receives a request to access an internet site supported by Local Director 200 by a domain name (e.g., www.NameX.com), that domain name is mapped to the IP address of the internet site. This is done by a DNS server. The DNS server does not provide a real IP address of a real machine, but instead provides a virtual IP address of a virtual machine which is implemented on Local Director 200. Local Director 200 then receives all packets sent to virtual IP addresses implemented on the Local Director and translates the addresses and port numbers to a selected IP address and port number for a selected individual server among the group of TCP based servers 312. Local Director 200 accomplishes this by changing the destination IP address and port number in each packet from the virtual IP address and port number which corresponds to the virtual machine to a real IP address and port number which corresponds to a single physical machine, i. e. the IP address and port number of the individual server which is selected or mapped to handle connections for that virtual IP address and port number Local Director 200 thus operates to distribute packets among group of TCP based servers 312 by intercepting each packet sent to a virtual machine and changing the destination IP address and port number in the packet from a virtual IP address and port number to a real IP address and port number which corresponds to a physical machine IP address and port number which has been made available to implement the virtual machine.

In the example shown, a physical machine 312A is configured to support three IP addresses. Ports 8001, 8002, and 8003 as shown have daemons running on them which run processes corresponding to port 80 for virtual IP addresses x.x.x.1, x.x.x.2, and .x.x.x.3, respectively. Physical machine 312A may also contain ports that correspond to the other well known ports as well as other ports, which are not shown. Physical machine 312B supports only a single virtual IP address, x.x.x.1. Port 80 of the virtual machine is therefore mapped directly to port 80 of physical machine 312B. Physical machine 312C specializes in handling WorldWide web traffic and so it contains only ports which are mapped to port 80 of various virtual machines. Local Director 200 translates packet IP addresses and port numbers to distribute packets among all of these machines.

It should be noted that packets addressed to x.x.x.1 and port 80 can be sent to any of the three physical machines. It should also be noted that packets addressed to any of x.x.x.1/port 80, x.x.x.2/port 80, and x.x.x.3/port 80 can be sent to either the first or third machine. A session distribution scheme decides which physical machine is to handle each new connection.

Figure 4A:
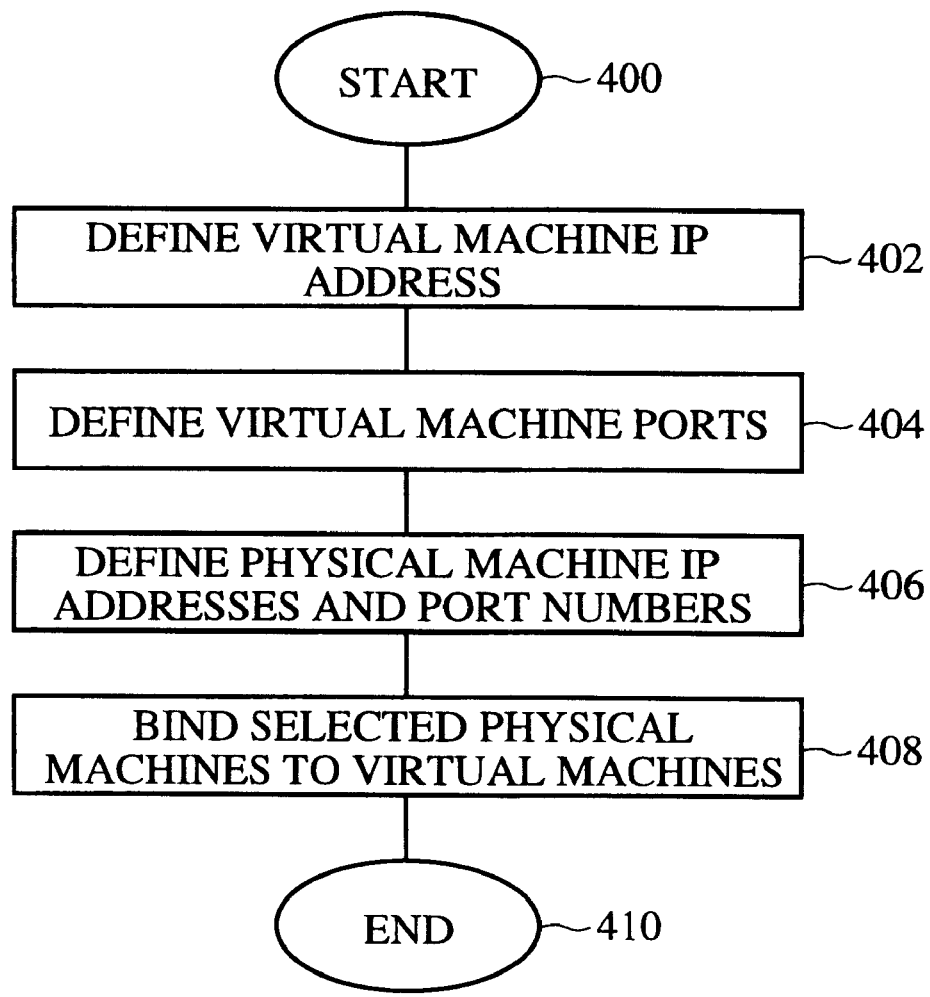
FIG. 4A illustrates a process which is implemented on the Local Director for defining virtual machines and binding them to physical machines and ports.

FIG. 4A illustrates a process which is implemented on Local Director 200 for defining virtual machines and binding them to physical machines and ports. The process starts at 400 and a virtual machine IP address is defined in a step 402. Virtual machine ports are defined in a step 404. Following steps 400 and 402, a virtual machine has been defined which has certain ports. Next, in a step 406, a physical machine object is defined with an IP address and port numbers. In a step 408, selected physical machines are bound to a virtual machine. In one embodiment, this may be accomplished one of three ways. First, an entire virtual machine may be bound to an entire physical machine so that the same port numbers bind to each other. Second, a virtual machine may be bound to a single physical machine port. Third, each port of the virtual machine may be bound individually to a physical machine port. The process ends at 410.

Figure 4B:
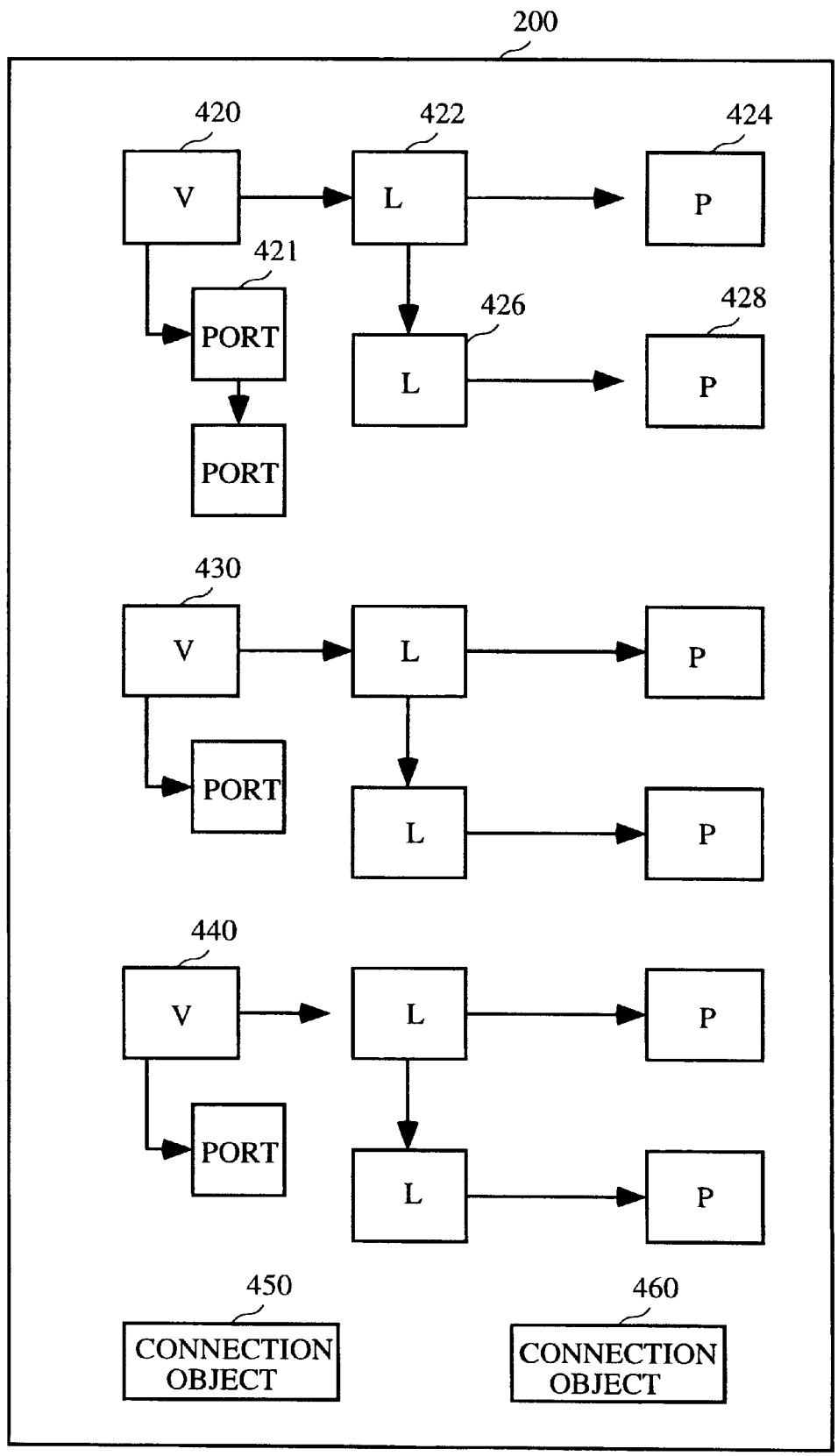
FIG. 4B illustrates the data structure within the Local Director in one embodiment.

Once the binding process of FIG. 4A is complete, a data structure is created within Local Director 200 that stores the relevant virtual machine and physical machine definitions and bindings. FIG. 4B illustrates the data structure within Local Director 200 in one embodiment. A first virtual machine object 420 stores information about a first virtual machine. Virtual machine object 420 points to a port object 421 that maps the virtual port of the virtual machine onto a physical port. Virtual machine object 420 also points to a Link object 422 which points to a physical machine object 424, as well as another link object 426 that points to a physical machine object 428. Together, the virtual machine objects form a linked list that facilitates searching for the virtual machine which corresponds to a new connection request. Likewise, the link objects form a linked list that facilitates searching for a physical machine to handle a new connection. Other virtual objects such as virtual objects 430 and virtual object 440 are also defined for other virtual machines. A connection object 450 and a connection object 460 contain pointers to the virtual machines and physical machines which correspond to the connections which they represent.

Figure 5:
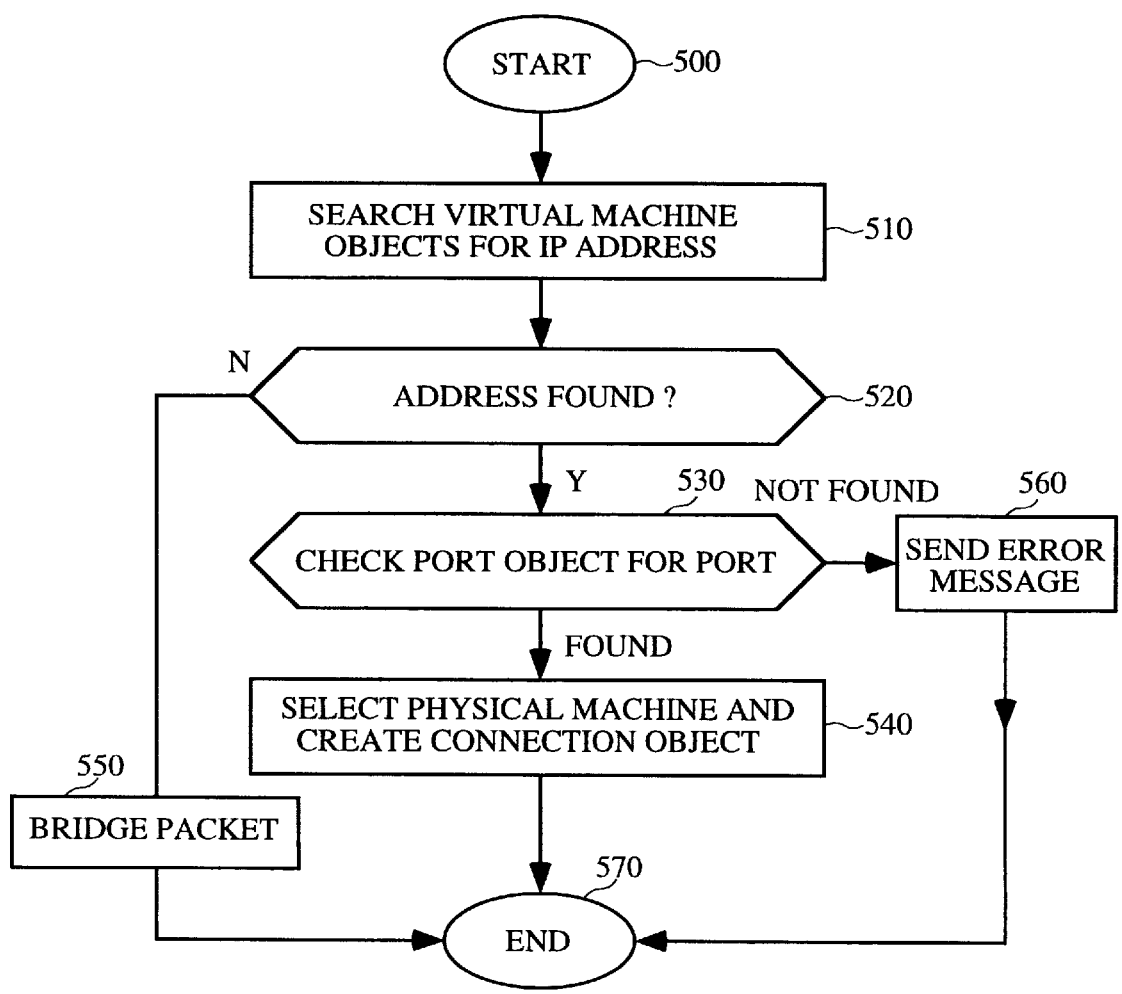
FIG. 5 is a flow diagram which illustrates a process for finding a virtual machine to handle a new connection, if one exists.

FIG. 5 is a flow diagram which illustrates a process for finding a virtual machine to handle a new connection, if one exists. The SYN packet for the new connection contains a destination IP address and port number. The process starts at 500. In a step 510, the virtual machine objects are searched for a virtual machine object which corresponds to the source IP address of the new packet. If one is found, then a step 520 transfers control to a step 530. The port objects on the linked list of port objects to which the virtual machine points are checked in step 530 to determine if the destination port of the SYN packet is implemented on the virtual machine that was found. If not, then control is transferred to a step 560 and an error message is sent, since the client is attempting to access one of the virtual machines, but has requested a port which is not supported. If the destination port is found, then control is transferred to a step 540 and a physical machine is selected to handle the connection and a connection object is created. The selection of the best physical machine to handle the connection using a session distribution algorithm is further described in to co-pending application Ser. No. 08/850,248, (Attorney Docket No. CISCP005 previously incorporated by reference.

As described below, the data structures mentioned above contain the information which is necessary to send packets to the appropriate physical machine which implements a virtual machine. For the purpose of clarity, some of the information in the objects which relates to allocating new connections to the best physical machine in some embodiments are not shown. Other data which is found in the objects in certain embodiments may be found in co-pending applications Ser. Nos. 08/850,248 and 08/850,836, (Attorney Docket Nos. CISCP005 and CISCP008 previously incorporated by reference.

FIG. 6A illustrates the data structure of a virtual machine object 600. Virtual machine object 600 includes a pointer to the next virtual machine object to facilitate searching through the virtual machine objects. Virtual machine object 600 also includes a virtual machine IP address 604 which stores the IP address of one of the virtual machines which is being implemented by Local Director 200. A pointer 606 to a port object accesses a linked list of port objects which list the physical machine port mapping for each of the ports supported by the virtual machine. A pointer 608 to a link object facilitates searching for the physical machine object which has the best predicted response according to the chosen session distribution scheme. A state variable 610 stores the state of the virtual machine. A backup variable 612 stores a backup for the virtual machine. The purpose of state variable 610 and backup variable 612 is to support virtual machine backups as is further described in co-pending application Ser. No. 08/850,836 (Attorney Docket No. CISCP008) previously incorporated by reference.

FIG. 6B illustrates the data structure of a physical machine object 620. Physical machine object 620 is used to store information related to a particular physical machine which is selected by Local Director 200 for the purpose of serving connections to a virtual machine. Physical machine object 620 contains a pointer 618 to the next physical machine object which facilitates searching among the physical machine objects. Physical machine object 620 also contains the real IP address 621 of the physical machine which it represents. A variable 622 stores the state of the physical machine and a variable 624 stores the number of ditched connections to the physical machine. A variable 626 stores the connection failure threshold and a pointer 628 points to a backup machine. The use of variable 622, variable 624, variable 626, and pointer 628 to fail a physical machine and transfer to a backup in certain embodiments is further described in described in to co-pending application Ser. No. 08/850,836, (Attorney Docket No. CISCP008) previously incorporated by reference. A port variable 630 stores a port number which indicates whether physical machine object 620 corresponds to an individual port on a machine. If port variable 630 is zero, then physical machine object 620 corresponds to all ports of a physical machine. Any other number is interpreted as a port number that the physical machine represents.

FIG. 6C illustrates a connection object data structure 640. Connection object 640 stores information related to individual connections made from a client to one of the physical machines. Connection object 640 includes a pointer 641 to the next connection object on its linked list hash chain. This pointer facilitates searching among the connection objects. In a preferred embodiment, the individual connection objects are stored in a hash chain to facilitate retrieval. Connection object 640 also includes the foreign IP address 642 and foreign port number 644 of the client which is making the connection, and the virtual machine address 646 and virtual machine port number 648 of the virtual machine which is being implemented for the connection. Connection object 640 also contains a physical machine pointer 650 to the physical machine object which contains the information about the physical machine to which the connection is made. A Variable 652 also stores the physical machine mapped port number. A variable 653 stores the number of resends of a SYN packet by the client attempting to establish a connection.

FIG. 6D illustrates a Port object data structure 660. Port object 660 is used to map the port requested by the client to be accessed on the virtual machine to the port on the selected physical machine to which the connection is actually made. Port object 660 includes a pointer 662 which points to the next port object in order to facilitate searching the port objects. A variable 664 stores the port number as viewed by the client. A variable 666 stores the port number as mapped to a physical machine port.

Using the data structures shown in FIG. 4B, and FIGS. 6A through 6D, Local Director 200 is able to provide the necessary IP addresses, port numbers, and pointers to define a connection object. The connection object contains all the information necessary to change the destination IP address and port number of incoming packets to the IP address and port number of a physical machine that is implementing a virtual machine. Likewise, the connection object contains all the information necessary to change the source IP address and port number of outgoing packets to the IP address and port number of a physical machine that is implementing a virtual machine.

Figure 7:
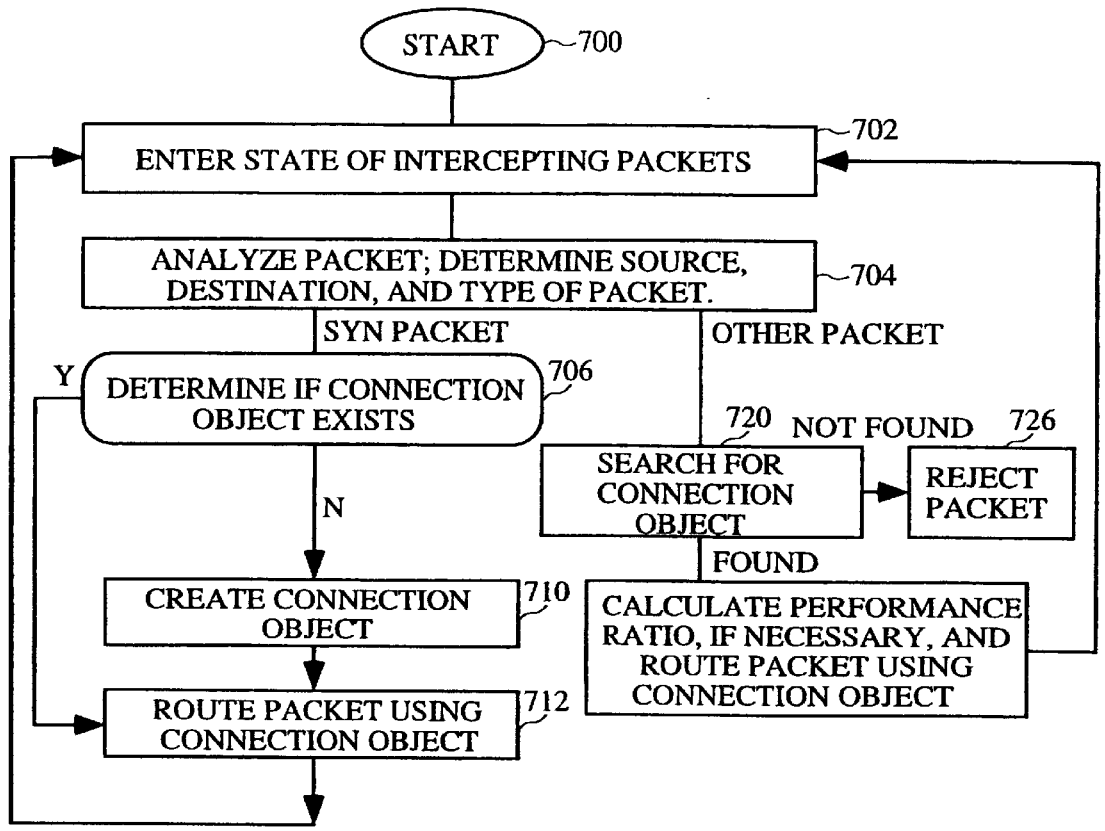
FIG. 7 is a flow diagram which illustrates a preferred process for handling an incoming packet which is addressed to one of the virtual machines implemented on the Local Director.

FIG. 7 is a flow diagram which illustrates a preferred process for handling an incoming packet which is addressed to one of the virtual machines implemented on Local Director 200. The process starts at 700. In a step 702, the Local Director enters a state wherein it intercepts all packets which are routed through it. Whenever a packet is received, control is transferred to step 704 and the packet is analyzed. The source IP address of the packet and the destination IP address of the packet are determined, as well as the type of packet (e.g., TCP packets SYN, ACK, ACK SYN, data, etc.)

If the packet is a SYN packet, then control is transferred to a step 706. The Local Director determines if a connection object already exists for the SYN packet. This is accomplished by searching the connection objects (e.g., connection objects 450 and 460 of FIG. 4B) for a connection which matches the foreign IP address and virtual machine IP address of the incoming SYN packet. In one embodiment, the connection objects are searched using a hash chain. A hashing function is used to hash virtual IP address and foreign IP address pairs to a given set of connections on a hash chain. Each connection object on an individual hash chain contains a pointer to the next connection object on that chain so that all of the connection objects on the chain can be quickly searched. Thus, the hashing function is used to quickly find a particular hash chain on which the connection object being searched for may be found. Each connection object on that hash chain contains a pointer to the next connection object so that if a connection object already exists for connection which the client is attempting to make, then it will be found in step 706. If no connection object is found, then a connection object is created in a step 710, if appropriate according. FIG. 5 details the process for analyzing an incoming new connection request to determine if a new connection object should be created. Control is then transferred to a step 712. If a connection object is found in step 706, then control is transferred directly to step 712 and the packet destination IP address and port number are redefined using the connection object. Thus, step 712 either sends the packet on using a newly created connection object from step 710 or the connection object which was found in step 706. Step 712 is described in further detail in FIG. 8.

Thus, for each SYN packet received by the Local Director for a virtual machine which is being implemented by the Local Director, a connection object is either found or created for the connection which the SYN packet is attempting to establish. An example of an instance where a connection object would be found for a SYN packet is when a first SYN packet is received by the Local Director and the ACK SYN packet sent by the selected physical machine in response to that SYN packet for some reason is not received by the client. In such a case, the client would then resend a SYN packet. Upon intercepting the resent SYN packet, the Local Director would then find the connection object which was created for the first SYN packet which was sent to a physical machine but was not acknowledged. In general, the connection between the client and a physical machine may be broken at any point, resulting in the need for the client to resend a SYN packet to the server. In such a case, the SYN packet sent from the client to the server would be recognized as a SYN packet for a connection which already has a connection object. Connection objects for which there has been no recent activity may be periodically deleted or overwritten.

SYN packets are the only packets which are sent to a physical machine IP address by Local Director 200 which do not necessarily already match a connection object. If, in step 704, the Local Director determines that the type of packet is any other packet than a SYN packet, then control is transferred to a step 720 and the Local Director searches for a connection object which matches the source and destination IP addresses of the packet as well as the source and destination ports. If no connection object is found for the packet in step 720, then control is transferred to step 726 and the packet is rejected. Rejected packets may be dropped in certain cases and may be bridged in others. In certain embodiments, Local Director 200 handles rejected packets differently according to the type of packet.

Whether the packet is routed using a new or found connection object for a SYN packet, or the packet is routed using a connection object which is found for a different type of packet or the packet is rejected, control is transferred back to 702 and the Local Director continues to intercept packets. Local Director 200 continues intercepting and processing packets until it fails or is interrupted. FIG. 7 thus illustrates how Local Director constantly intercepts packets, determines whether a connection object exists for those packets, creates connection objects where appropriate, and routes the packets to their proper destination.

Figure 8:
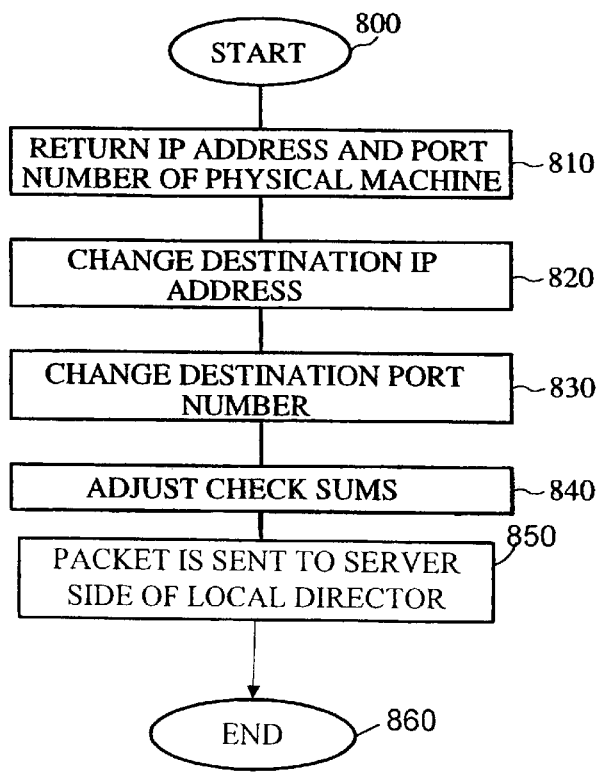
FIG. 8 is flow diagram which illustrates the process implemented by the Local Director to translate the destination IP address and port number of an incoming data packet from a client and route that data packet to the proper physical machine which is connected to the Local Director.

FIG. 8 is flow diagram which illustrates the process implemented by the Local Director to translate the destination IP address and port number of an incoming data packet from a client and route that data packet to the proper physical machine which is connected to the Local Director (i.e., step 712 described from FIG. 7). The process is based on the Local Director finding the connection object which defines the proper destination IP address and port number for the packet so that it is sent to the right port on the right physical machine that is implementing the process corresponding to the destination IP address and port number specified by the client. If no connection object already exists, the Local Director creates a connection object for the connection. In certain embodiments, creating the connection object includes determining the best physical machine from among a group of available physical machines to handle the connection.

The process begins at 800. The Local Director has intercepted an incoming data packet that has a destination IP address and port number that corresponds to one of the virtual machines which is being implemented by the Local Director. A connection object was either found or created for the packet. In a step 810, the connection object returns the IP address and the port number of the physical machine which the connection object has specified for the connection. The Local Director now has the information necessary change the destination IP address in the incoming packet by replacing the virtual machine IP address with the physical machine IP address to which the connection is to be routed. In a step 820, the Local Director changes the destination IP address of the incoming packet to match the IP address which it obtained from the physical machine object pointed to by the connection object. In a step 830, the destination port number of the incoming packet is changed to the correct port number for that physical machine. Since these changes to the packet header effect the check sums which determine whether the packet has been corrupted, a step 840 adjusts the check sums so that the changes do not appear to have corrupted the data. Next, in step 850, the packet is sent to the server side of the Local Director and the process is completed at 860.

Figure 9:
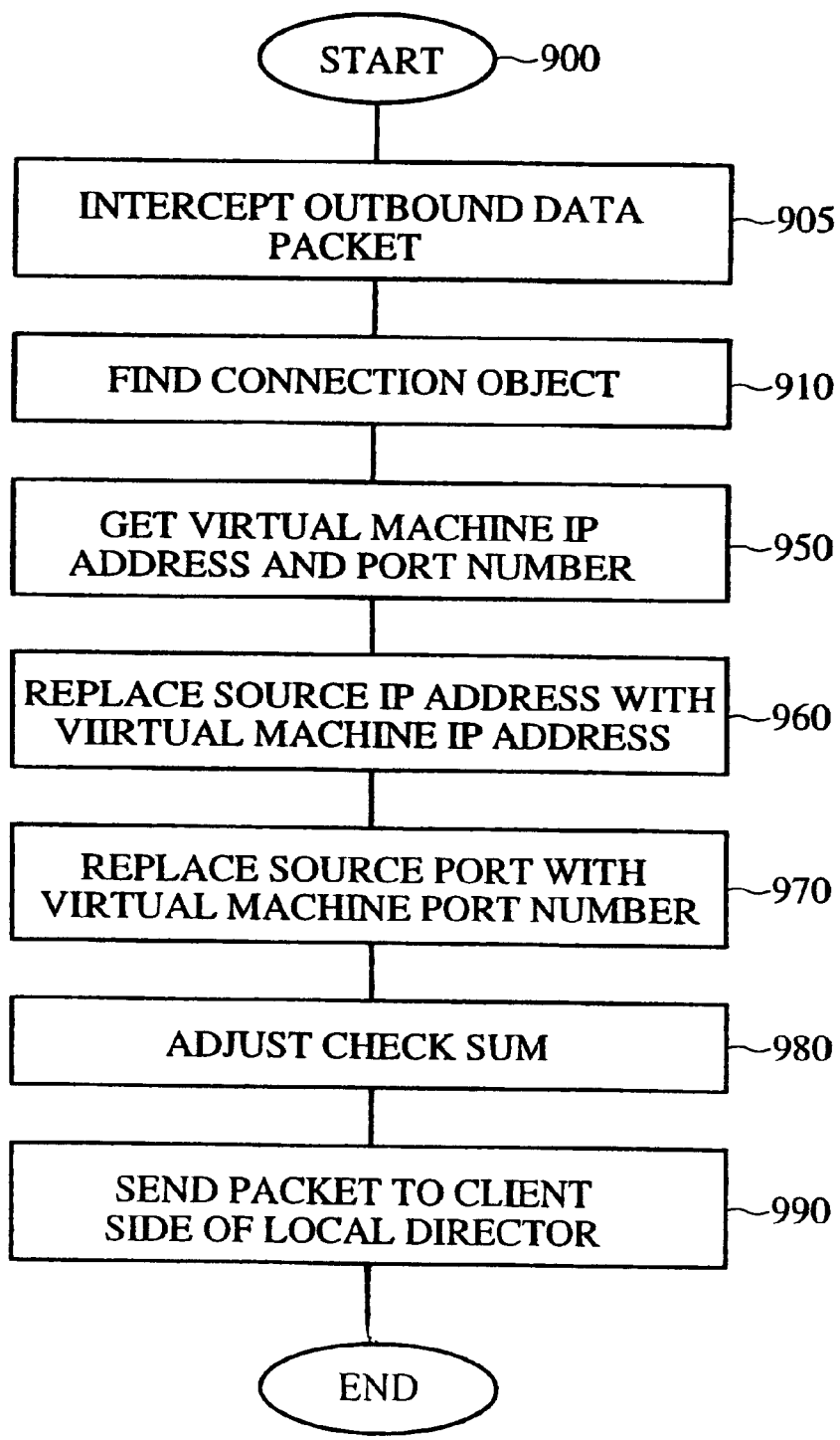
FIG. 9 is a flow diagram which describes the process implemented on the Local Director for translating and routing data packets outbound to clients.

FIG. 9 is a flow diagram which describes the process implemented on the Local Director for translating and routing data packets outbound to clients. A packet sent from one of the physical machines connected to the Local Director will have the proper destination IP address to the intended outside client, but the source IP address will be the source IP address of the physical machine and not the IP address of the virtual machine which the Local Director is simulating. It is therefore necessary to replace the source IP address of the physical machine with the source IP address of the virtual machine which is being simulated. This is accomplished by finding the connection object for the data packet and using the virtual machine IP address and port number found in the connection object.

The process begins at 900. An outbound data packet is intercepted at a step 905. The Local Director then finds the connection object for that data packet in a step 910. Control is then transferred to a step 950. In step 950, the connection object returns the virtual machine IP address and the virtual machine port number corresponding to the virtual machine from which the packet is to be sent. Next, in a step 960, the source IP address of the packet is replaced with the virtual machine IP address from the connection object. In step 970, the source port number is replaced with the virtual machine port number. The check sum of the packet header is adjusted in step 980 and finally, the packet is sent to the client side of the Local Director in a step a 990. The process ends at 995.

The Local Director thus functions to receive packets on its client side intended for a virtual machine which the Local Director is supporting and routes those packets to the physical machine port which is running the process which is expected to be run on the virtual machine port requested by the user. This is accomplished by defining a connection object for each of the connections requested by a client. The connection object keeps track of the virtual machine IP address and port number to which the client is attempting to connect as well as the physical machine IP address and port number to which the Local Director has assigned to that connection. The source IP address and port number is replaced in all outbound data packets from physical machines so that it appears to the client that it is receiving packets from the virtual machine port which it attempted to access. Thus, the Local Director effectively simulates the existence of one or more virtual machines to outside clients that are implemented on one or physical machines that actually handle the clients.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. It is therefore intended that the following appended claims be interpreted as including all such alterations, permutations, and equivalents as fall within the spirit and scope of the present invention.

What is claimed is:

1. A packet translation system for handling connections from clients on an external network to a plurality of IP addresses with a server having a server IP address and a server port number comprising:
  a client interface to the external network, the client interface being operative to receive and send packets to and from a remote client;
  a server interface to an internal network, the server interface being operative to receive and send packets to and from the server, the server being operative to establish a connection with the remote client;
  a packet interceptor which is operative to intercept incoming packets received at the client interface which have a packet destination IP address and a packet destination port number corresponding to a virtual machine IP address and a virtual machine port number which is supported by the packet translation system;
  a packet header translator which is operative to translate the packet destination IP address and the packet destination port number of packets forwarded by the packet interceptor to a physical machine IP address and a physical machine port number that corresponds to the server IP address and the server port number of the server, the server port running a real process corresponding to a virtual process simulated on the virtual port number;
  whereby the packet translation system receives packets at the client interface and the packet destination IP address and the packet destination port number corresponding to the virtual machine IP address and the virtual machine port number are translated to the server IP address and the server port number and the packets are forwarded to the server via the server interface.

2. A system as recited in claim 1, further including a connection database which includes for each connection handled by the packet translation system, a connection object that stores a connection source IP address and a connection source port number, a connection virtual machine IP address and a connection virtual machine port number, and a connection physical machine IP address and a connection physical machine port number, whereby the connection database provides all of the information required to translate the packet headers.

3. A system as recited in claim 2, wherein the connection objects are stored in a linked list.

4. A system as recited in claim 3 wherein the connection objects are searched upon the receipt of an incoming packet using a hash of the connection source IP address and the connection virtual machine IP address.

5. A system as recited in claim 1, further including a virtual machine database including a plurality of virtual machine objects, each virtual machine object including a virtual machine object IP address and a virtual machine object port number for a virtual machine supported by the packet translation system.

6. A system as recited in claim 5 wherein the plurality of virtual machine objects are stored in a linked list.

7. A system as recited in claim 1, further including a physical machine database including a plurality of physical machine objects including a physical machine object IP address for each physical machine available to the packet translation system.

8. A system as recited in claim 7 wherein the plurality of physical machine objects are stored in a linked list.

9. A system as recited in claim 1 wherein the packet interceptor rejects packets having a packet destination IP address which corresponds to a virtual machine IP address of one of the virtual machines supported by the packet translation system and having a packet destination port which does not correspond to a virtual machine port of one of the virtual machines supported by the packet translation system.

10. A system as recited in claim 1, wherein the packet interceptor is further operative to intercept outgoing packets received at the server interface, the outgoing packets having a packet source IP address and a packet source port number and wherein the packet header translator is further operative to translate the packet source IP address and the packet source port number of outgoing packets to a physical machine IP address and a physical machine port number that corresponds to the server IP address and the server port number of the server which runs a real process corresponding to a virtual process simulated on the virtual port number.

11. A packet translation system for handling connections from clients on an external network to a plurality of IP addresses with a plurality of servers on an internal network, the plurality of servers having a plurality of server IP addresses and a plurality of server port numbers comprising:
  a client interface to the external network, the client interface being operative to receive and send packets to and from a remote client;
  a server interface to the internal network, the server interface being operative to receive and send packets to and from a server, the server being operative to establish a connection with the remote client;
  a connection distributor which is operative to distribute connections to a selected server having a selected server IP address and a selected server port number from the plurality of servers;
  a packet interceptor which is operative to intercept incoming packets received at the client interface which have a packet destination IP address and a packet destination port number corresponding to a virtual machine IP address and a virtual machine port number which is supported by the packet translation system;
  a packet header translator which is operative to translate the packet destination IP address and the packet destination port number of incoming packets to a physical machine IP address and a physical machine port number that corresponds to the selected server IP address and the selected server port number which runs a real process corresponding to a virtual process simulated on the virtual port number;

whereby the packet translation system receives packets at the client interface and the packet destination IP address and the packet destination port number corresponding to the virtual machine IP address and the virtual machine port number are translated to the server IP address and the server port number and the packets are forwarded to the server via the server interface.

12. A system as recited in claim 11, wherein the connection distributor distributes connections to a selected server from the plurality of servers which is predicted to be the fastest server for handling the connection.

13. A method for handling connections from clients on an external network to a plurality of IP addresses with a server having a server IP address and a plurality of server port numbers, each port number corresponding to a distinct one of the plurality of IP addresses comprising:

receiving an incoming packet from a remote client, the incoming packet having a packet destination IP address and a packet destination port number corresponding to a virtual machine IP address and a virtual machine port number which is supported by the server;

translating the packet destination IP address and the packet destination port number of incoming packets to a physical machine IP address and a physical machine port number that corresponds to the server IP address and the server port number of the server, the server running a real process corresponding to a virtual process simulated on the virtual port number;

forwarding the packet to the server, the server being operative to establish a connection with the remote client;

whereby packets are received and the packet destination IP address and the packet destination port number corresponding to the virtual machine IP address and the virtual machine port number are translated to the server IP address and the server port number and the packets are forwarded to the server.

14. A method as recited in claim 13, further including:

creating a connection database which includes for each connection, a connection object that stores a connection source IP address and a connection source port number, a connection virtual machine IP address and a connection virtual machine port number, and a connection physical machine IP address and a connection physical machine port number, whereby the connection database provides all of the information required to translate the packet headers.

15. A method as recited in claim 14, wherein the connection objects are stored in a linked list.

16. A method as recited in claim 14 further including searching the connection objects upon the receipt of an incoming packet using a hash of the connection source IP address and the connection virtual machine IP address.

17. A method as recited in claim 13, further including creating a virtual machine database including a plurality of virtual machine objects, each virtual machine object including a virtual machine object IP address and a virtual machine object port number for a virtual machine supported by the server.

18. A method as recited in claim 17 wherein the plurality of virtual machine objects are stored in a linked list.

19. A method as recited in claim 13, further including creating a physical machine database including a plurality of physical machine objects including a physical machine object IP address for plurality of physical machines.

20. A method as recited in claim 19 wherein the plurality of physical machine objects are stored in a linked list.

21. A method as recited in claim 13 further including rejecting packets having a packet destination IP address which corresponds to a virtual machine IP address of one of the virtual machines supported by the server and having a packet destination port which does not correspond to a virtual machine port of one of the virtual machines supported by the server.

22. A method as recited in claim 13, further including intercepting outgoing packets received at a server interface, the outgoing packets having a packet source IP address and a packet source port number; and translating the packet source IP address and the packet source port number of outgoing packets to a physical machine IP address and a physical machine port number that corresponds to the server IP address and the server port number of the server running a real process corresponding to a virtual process simulated on the virtual port number.

23. A packet translation system for forwarding a packet to a server having a server IP address and two or more server ports, each corresponding to a distinct one of two or more defined virtual IP addresses, the packet having a packet destination IP address matching one of the two or more defined virtual IP addresses, the packet translation system comprising:

a client interface to an external network, the client interface being operative to receive packets from a remote client;

a server interface to the server, the server interface being operative to send packets to the server, the server being operative to handle packets sent from the remote client; and a packet translator which is operative to translate the packet destination IP address to the server IP address and to provide a destination port address to the packet, which destination port address is selected from the two or more ports and corresponds to the packet destination IP address.

* * * * *